United States Patent
Yu et al.

(10) Patent No.: US 8,767,853 B2
(45) Date of Patent: Jul. 1, 2014

(54) APPARATUS AND METHOD FOR CONTROLLING DISTORTION SIGNAL AND SYSTEM BY USING THE SAME

(75) Inventors: Chang Wahn Yu, Daejeon (KR); Gweon Do Jo, Daejeon (KR); Jung Hoon Oh, Daejeon (KR); Kwang Chun Lee, Daejeon (KR); Jae Ho Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/587,296

(22) Filed: Aug. 16, 2012

(65) Prior Publication Data

US 2013/0251055 A1  Sep. 26, 2013

(30) Foreign Application Priority Data

Mar. 20, 2012 (KR) .................. 10-2012-0028055

(51) Int. Cl.
*H04K 1/10* (2006.01)
*H04L 27/28* (2006.01)

(52) U.S. Cl.
USPC ............ 375/260; 375/285; 375/295; 375/296

(58) Field of Classification Search
CPC . H04L 27/2647; H04L 5/0007; H04L 1/0003; H04L 1/0071; H04L 25/062; H04B 3/32; H03F 1/3247
USPC .................................. 375/260, 295, 285, 296
See application file for complete search history.

(56) References Cited

U.S. PATENT DOCUMENTS

| | | |
|---|---|---|
| 2005/0169411 A1 | 8/2005 | Kroeger |
| 2008/0031380 A1* | 2/2008 | Takabayashi ................. 375/297 |
| 2011/0210789 A1* | 9/2011 | Ohkawara et al. ............ 330/149 |

FOREIGN PATENT DOCUMENTS

| | | |
|---|---|---|
| JP | 2005-51457 | 2/2005 |
| KR | 1020080034264 | 4/2008 |
| KR | 10-2011-0050844 | 5/2011 |
| KR | 10-1056566 | 8/2011 |

* cited by examiner

*Primary Examiner* — Ted Wang
(74) *Attorney, Agent, or Firm* — Nelson Mullins Riley & Scarborough LLP; Anthony A. Laurentano, Esq.; Lewis Lee, Esq.

(57) ABSTRACT

Disclosed are a signal distortion component adjusting apparatus and method capable of adjusting error vector magnitude of subcarriers of a predetermined position by adjusting a signal distortion component occurring while decreasing a peak to average power ratio (PAPR) in a communication system of an orthogonal frequency division multiplexing (OFDM) technology or an orthogonal frequency division multiple access (OFDMA) scheme, and a system using the same. The present invention includes a signal distortion component adjusting unit to add an additional signal distortion component Pe((n+N/2) % N) to a signal distortion component e(n) that is obtained by subtracting a threshold Th value, set to decrease peak power, from an absolute value of a time domain signal x(n) of an input signal, and to thereby adjust the signal distortion component. The present invention may transmit a highly reliable signal by adjusting error vector magnitude of subcarrier of a frequency domain.

17 Claims, 3 Drawing Sheets

APPARATUS AND METHOD FOR CONTROLLING DISTORTION SIGNAL AND SYSTEM BY USING THE SAME

CROSS-REFERENCE TO RELATED APPLICATIONS

This application claims priority to and the benefit of Korean Patent Application No. 10-2012-0028055 filed in the Korean Intellectual Property Office on Mar. 20, 2012, the entire contents of which are incorporated herein by reference.

TECHNICAL FIELD

The present invention relates to a signal distortion component adjusting apparatus and method, and a system using the same. More particularly, the present invention relates to a signal distortion component adjusting apparatus and method capable of adjusting error vector magnitude (EVM) of subcarriers at a predetermined position by adjusting a signal distortion component occurring while decreasing a peak to average power ratio (PAPR) in a communication system of an orthogonal frequency division multiplexing (OFDM) technology or an orthogonal frequency division multiple access (OFDMA) scheme, and a system using the same.

BACKGROUND ART

As a demand for a large data service such as various multimedia Internet services is increasing in wireless communication, an orthogonal frequency division multiplexing (OFDM) technology and an orthogonal frequency division multiple access (OFDMA) scheme are in the spotlight as a wireless transmission technology capable of satisfying the demand.

The OFDM technology is a multiplexing technology in an aspect of simultaneously transmitting data using multiple channels and is also a kind of modulation technology in an aspect of dividing data and thereby transmitting the data using multiple subcarriers.

The OFDMA scheme is a scheme in which a plurality of users is differently allocated with a set of valid subcarriers and thereby uses the allocated subcarriers instead of a scheme in which a single user exclusively uses all the valid subcarriers.

The OFDM technology or the OFDMA scheme is applied to standards such as an Institute of Electrical and Electronics Engineers (IEEE) 802.16e wireless broadband (WiBro) standard, a mobile worldwide interoperability for microwave access (WiMAX) standard, a wireless local area network (WLAN) standard, a 3rd generation partnership project-long term evolution (3GPP-LTE) standard, and the like.

In the OFDM technology or the OFDMA scheme, a transmitted signal becomes a time domain signal that is inverse fast Fourier transformed (IFFT) based on a symbol unit. The IFFT signal has a characteristic in which magnitude of a signal is not consistently maintained. Due to the above characteristic, a peak to average power ratio (PAPR) is very great in the OFDM technology or the OFDMA scheme compared to other modulation schemes.

Since a PAPR is great in the OFDM technology or the OFDMA scheme, the OFDM technology or the OFDMA scheme may not efficiently use a power amplifier. Accordingly, the OFDM technology or the OFDMA scheme requires a technology to efficiently decrease the PAPR.

A variety of methods, for example, a peak cancellation crest factor reduction (PC-CFR) using a cancellation pulse generator (CPG), filtering, and the like may be employed as a method to decrease a PAPR. However, such method to decrease a PAPR may generate a signal distortion in all the frequency domains using a scheme of removing a predetermined portion of a peak value and the like.

SUMMARY OF THE INVENTION

The present invention has been made in an effort to provide a distortion signal adjusting apparatus and method for adjusting error vector magnitude (EVM) of subcarrier at a predetermined position by adding a predetermined component to a signal distortion component, and a system using the same.

An exemplary embodiment of the present invention provides an apparatus for adjusting a signal distortion component occurring when a peak to average power ratio (PAPR) decreases in a communication system of an orthogonal frequency division multiplexing (OFDM) technology or an orthogonal frequency division multiple access (OFDMA) scheme, the apparatus including a signal distortion component adjusting unit to add an additional signal distortion component $Pe((n+N/2) \% N)$ to a signal distortion component $e(n)$ that is obtained by subtracting a threshold Th value, set to decrease peak power, from an absolute value of a time domain signal $x(n)$ of an input signal, and to thereby adjust the signal distortion component. Here, n denotes an integer from zero to a number that is obtained by subtracting '1' from N that is the number of signals processed based on a symbol unit, and % denotes a modular operation.

When an absolute value of the $e(n)$ is not zero and when an absolute value of $e((n+N/2) \% N)$ is zero in the n, the $Pe((n+N/2) \% N)$ may have the same value as the $e(n)$, and in other cases, may be zero.

The signal distortion component may be adjusted by adding, to the $e(n)$, $G \times Pe((n+N/2) \% N)$ that is obtained by multiplying the $Pe((n+N/2) \% N)$ by G that is any one real number among real numbers from −1 to 1.

The signal distortion component adjusting apparatus may further include a G selector to select the G to adjust EVM of subcarrier in a predetermined position.

The G selector may select G as 1 to decrease the EVM of the subcarrier when the subcarrier is an odd subcarrier, or may select G as −1 to decrease the EVM of the subcarrier when the subcarrier is an even subcarrier.

The adjusted signal distortion component in which the additional signal distortion component is added to the signal distortion component may be a component in which a value in n is equal to a value in $(n+N/2) \% N$.

The $e(n)$ may be obtained by multiplying a phase component $\theta(n)$ of the $x(n)$ by an imaginary number unit, by generating, as an exponential function, the $\theta(n)$ multiplied by the imaginary number unit, and by multiplying, by the exponential function, a value that is obtained by subtracting the Th value from the absolute value of the $x(n)$.

Another exemplary embodiment of the present invention provides a method of adjusting a signal distortion component occurring when a PAPR decreases in a communication system of an OFDM technology or an OFDMA scheme, the method including adding an additional signal distortion component $Pe((n+N/2) \% N)$ to a signal distortion component $e(n)$ that is obtained by subtracting a threshold Th value, set to decrease peak power, from an absolute value of a time domain signal $x(n)$ of an input signal, to thereby adjust the signal distortion component.

Here, n denotes an integer from zero to a number that is obtained by subtracting '1' from N that is the number of signals processed based on a symbol unit, and % denotes a modular operation.

When an absolute value of the e(n) is not zero and when an absolute value of e((n+N/2) % N) is zero in the n, the Pe((n+N/2) % N) may have the same value as the e(n), and in other cases, may be zero.

The c(n) may be obtained by adding the e(n) to G×Pe((n+N/2) % N) that is obtained by multiplying the Pe((n+N/2) % N) by G that is any one real number among real numbers from −1 to 1.

The signal distortion component adjusting method may further include selecting the G to adjust EVM of subcarrier in a predetermined position.

The selecting of the G may select G as 1 to decrease the EVM of the subcarrier when the subcarrier is an odd subcarrier, or may select G as −1 to decrease the EVM of the subcarrier when the subcarrier is an even subcarrier.

The e(n) may be obtained by multiplying a phase component θ(n) of the x(n) by an imaginary number unit, by generating, as an exponential function, the θ(n) multiplied by the imaginary number unit, and by multiplying, by the exponential function, a value that is obtained by subtracting the Th value from the absolute value of the x(n).

Still another exemplary embodiment of the present invention provides a wireless communication system in which a signal distortion component is adjusted and including an apparatus of adjusting a signal distortion component occurring when a PAPR decreases in a communication system of an OFDM technology or an OFDMA scheme, wherein the signal distortion component adjusting apparatus includes a signal distortion component adjusting unit to add an additional signal distortion component Pe((n+N/2) % N) to a signal distortion component e(n) that is obtained by subtracting a threshold Th value, set to decrease peak power, from an absolute value of a time domain signal x(n) of an input signal, and to thereby adjust the signal distortion component. Here, n denotes an integer from zero to a number that is obtained by subtracting '1' from N that is the number of signals processed based on a symbol unit, and % denotes a modular operation.

The wireless communication system may further include an OFDM modulation apparatus to receive a frequency domain signal, and to transform the frequency domain signal to the time domain signal x(n).

According to exemplary embodiments of the present invention, it is possible to transmit a highly reliable signal by adjusting EVM of subcarrier of a frequency domain. Accordingly, the present invention may be employed for transmission requiring high reliability such as transmission of an important signal, retransmission of a signal, and the like.

Further, the present invention may be applied to a base station. Any one base station may transmit a signal by removing a signal distortion component in an even subcarrier, and another one base station may transmit a signal by removing a signal distortion component in an odd subcarrier. The above transmission may decrease interference between signals that are transmitted between base stations, and may increase a signal to noise ratio (SNR).

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

When it is described that a constituent element is "connected to" or "accessed" to another constituent element, the constituent element may be directly connected to or accessed to the other constituent element. However, it should be understood that still another constituent element may be present between the constituent element and the other constituent element. On the other hand, when it is described that a constituent element is "directly connected to" or "directly accessed" to another constituent element, it should be understood that still another constituent element may not be present between the constituent element and the other constituent element.

Figure 1:
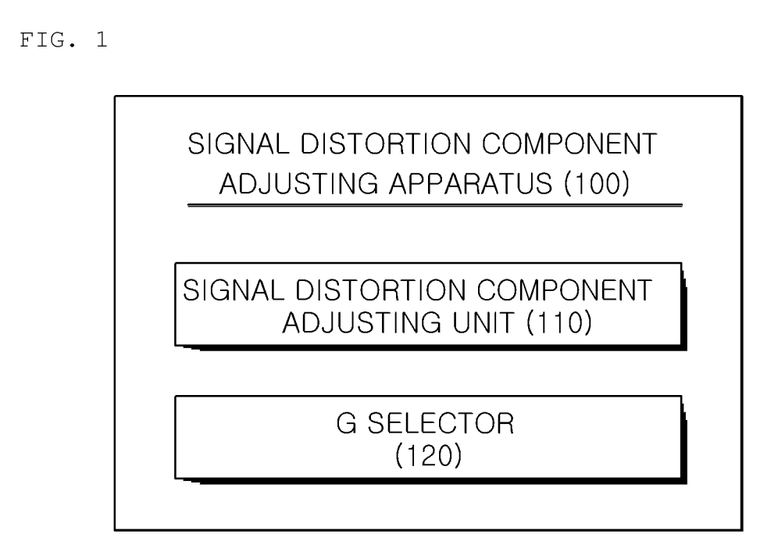
FIG. 1 is a block diagram illustrating a signal distortion component adjusting apparatus according to an exemplary embodiment of the present invention.
Figure 2:
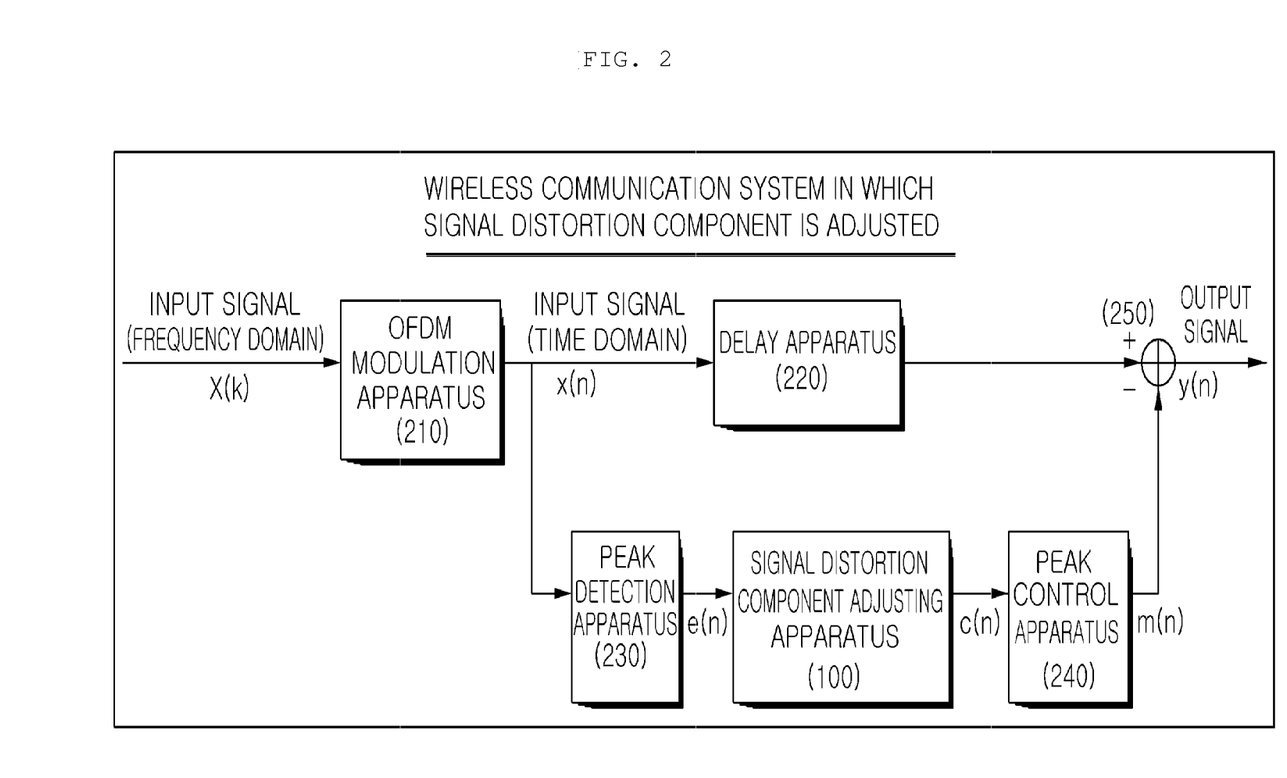
FIG. 2 is an exemplary diagram illustrating an exemplary example of a wireless communication system in which a signal distortion component is adjusted by applying a signal distortion component adjusting apparatus according to an exemplary embodiment of the present invention.

FIG. 1 is a block diagram illustrating a signal distortion component adjusting apparatus 100 according to an exemplary embodiment of the present invention. FIG. 2 is an exemplary diagram illustrating an exemplary example of a wireless communication system in which a signal distortion component is adjusted by applying the signal distortion component adjusting apparatus 100 according to an exemplary embodiment of the present invention.

Describing the signal distortion component adjusting apparatus 100 with reference to FIGS. 1 and 2, the signal distortion component adjusting apparatus 100 may include a signal distortion component adjusting unit 110 and a G selector 120.

The signal distortion component adjusting unit 110 adjusts a signal distortion component by adding an additional signal distortion component Pe((n+N/2) % N) to e(n) that is an array of a value obtained by subtracting a Th value from an absolute value of x(n).

x(n) is an input signal of a time domain. The Th value that is a threshold is a value set to decrease peak power. The Th value may be a value set based on the maximum peak value allowed in a system, and the like.

Error vector magnitude (EVM) is a difference between an idealistic reference signal and a measured signal. That is, the EVM indicates residual noise and distortion remaining after the idealistic signal version is removed.

Describing x(n) and e(n) with reference to FIG. 2, x(n) is a signal obtained by modulating, by an orthogonal frequency domain multiplexing (OFDM) modulation apparatus 210, an input signal X(k) of a frequency domain using an OFDM technology and transforming X(k) to an input signal of a time domain. Transformation from the frequency domain to the time domain may be performed through inverse fast Fourier transform (IFFT). x(n) may be expressed by Equation 1:

$$x(n) = \frac{1}{N}\sum_{k=0}^{N-1} X(k)\exp(j2\pi kn/N) \quad \text{[Equation 1]}$$

In Equation 1, X(k) denotes the input signal of the frequency domain, and N denotes the number of signals processed based on an OFDM symbol unit. k denotes an order of subcarrier in the frequency domain.

A peak detection apparatus 230 receives x(n) and outputs e(n). e(n) is a signal distortion component that is one of causes of signal distortion that occurs while decreasing a peak to average power ratio (PAPR) in wireless communication using an OFDM technology or an orthogonal frequency domain multiple access (OFDMA) scheme. e(n) may be expressed by Equation 2:

$$e(n) = \begin{cases} (|x(n)|-Th)\exp(j\theta(n)) & \text{if } |x(n)| > Th \\ 0 & \text{else} \end{cases} \quad \text{[Equation 2]}$$

In Equation 2, |x(n)| denotes an absolute value of x(n), and θ(n) denotes a phase component of x(n). The Th value denotes a threshold to decrease peak power. That is, e(n) denotes a signal in which a threshold (Th value) set in an apparatus or a system is subtracted from an input signal of a time domain. x(n) and e(n) may be provided as an array.

The present invention adjusts a signal distortion component so that C(k) may become zero when k is either odd or even by appropriately adding an additional signal distortion component to e(n). Through adjustment of the signal distortion component, it is possible to adjust EVM of subcarrier at a predetermined position such as an even position or an odd position.

When an absolute value of e(n) is not zero and when an absolute value of e((n+N/2) % N) is zero in the time domain, the additional signal distortion component Pe((n+N/2) % N) is equal to 상기 ?e(n) and in other cases, is zero. Pe((n+N/2) % N) may be expressed by Equation 3:

$$Pe\left(\left(n+\frac{N}{2}\right)\%N\right) = \begin{cases} e(n) & \text{if } (|e(n)|>0) \text{ and } \left(\left|e\left(\left(n+\frac{N}{2}\right)\%N\right)\right|=0\right) \\ 0 & \text{else} \end{cases}$$

In Equation 3, % denotes a modular operation. The modular operation indicates an operation that uses, as a result value, a remainder instead of using a solution obtained when dividing a predetermined value a by a predetermined value b. For example, 14%3 becomes 2. The modular operation is used for circulation from zero to N−1 and in order not to move to a subsequent symbol.

In Equation 3, a condition that |e(n)|>0 and |e(n+N/2) % N|=0 is to make a signal distortion component of a point n be equal to a signal distortion component of a point (n+N/2) % N in a case where the signal distortion component is present at the point n and the signal distortion component is absent at the point (n+N/2) % N.

Here, in a case where the signal distortion component is present at the point n, and the signal distortion component is already present at the point (n+N/2) % N, the additional signal distortion component is not added. In a case where the signal distortion component is present at the point n, and the signal distortion component is already present at the point (n+N/2) % N, the signal distortion component of the point n may be adjusted to be equal to the signal distortion component of the point (n+N/2) % N by adding the additional signal distortion component.

In the OFDM technology or the OFDMA scheme, a peak value appears to be high in a predetermined frequency, but is formed to be less than a threshold set in a system and the like in most frequencies. Accordingly, e(n) may have a value of zero in most of n. That is, there barely exists a case where the signal distortion component is present at the point n, and the signal distortion component is already present at the point (n+N/2) % N and thus, it is possible to achieve the object of the present invention.

c(n) denotes a signal for adjusting a signal distortion component occurring from e(n) in a subcarrier at a predetermined position. c(n) may be expressed by Equation 4.

$$c(n) = e(n) + G \times pe\left(\left(n+\frac{N}{2}\right)\%N\right) \quad \text{[Equation 4]}$$

Here, G has a real number value of −1≤G≤1. Pe(n) and c(n) may be provided as an array.

To explain why the signal distortion component adjusting apparatus 100 is capable of adjusting EVM of subcarrier at a predetermined position using c(n), an equation will be folded by performing discrete Fourier transform (DFT) of c(n) to a frequency domain.

$$C(k) = \sum_{n=0}^{N-1} c(n)\exp(-j2\pi nk/N) \quad \text{[Equation 5]}$$

Equation 5 is an equation for transforming c(n) to the frequency domain. C(k) is obtained by performing DFT of c(n). k denotes an order of subcarrier in the frequency domain.

When folding c(n)exp(−j2πnk/N) in C(K), it is expressed by Equation 6:

$$C(n)\exp\left(\frac{-j2\pi nk}{N}\right) = \quad \text{[Equation 6]}$$

-continued $$e(n)\exp\left(\frac{-j2\pi nk}{N}\right) + GPe\left((n+\frac{N}{2})\%N\right)\exp\left(\frac{-j2\pi(n+\frac{N}{2})k}{N}\right)$$

$\exp(-j2\pi(N/2)k/N)$ of Equation 6 may be expressed by Equation 7:

$$\exp\left(\frac{-j2\pi(n+\frac{N}{2})k}{N}\right) = \exp\left(\frac{-j2\pi nk}{N}\right)\exp\left(\frac{-j2\pi(\frac{N}{2})k}{N}\right) = \exp\left(\frac{-j2\pi nk}{N}\right)\exp(-j\pi k)$$ [Equation 7]

In Equation 7, when k is an even number, $\exp(-j\pi k)$ is 1. When k is an odd number, $\exp(-j\pi k)$ is −1.

$\exp(-j\pi k)$ becomes ±1, and array c(n) is obtained by adding $Pe((n+N/2) \% N)$ to e(n). Therefore, c(n) value in n is equal to $C((n+N/2) \% N)$ value in $(n+N/2) \% N$. Accordingly, Equation 7 may be expressed by Equation 8:

$$c(n)\exp\left(\frac{-j2\pi nk}{N}\right) = e(n)\exp\left(\frac{-j2\pi nk}{N}\right) \pm G\ e(n)\exp\left(\frac{-j2\pi nk}{N}\right)$$ [Equation 8]

Referring to Equation 8, in a case where k is an even number when a value of G is 1, C(k) may increase and EVM may also increase. However, in a case where k is an odd number when a value of G is 1, $\exp(-j\pi k)$ becomes −1 whereby $c(n)\exp(-j2\pi nk/N)$ becomes zero. That is, C(k) becomes zero. Accordingly, when a value of G is 1, C(k) becomes zero and EVM also decreases in a subcarrier in which k is an odd number.

In a case where k is an even number when a value of G is −1, $\exp(-j\pi k)$ becomes 1 whereby $c(n)\exp(-j2\pi nk/N)$ becomes zero. That is, C(k) becomes zero. Accordingly, when a value of G is −1, C(k) becomes zero and EVM also decreases in a subcarrier in which k is an even number.

For example, when N is 2048, n becomes {0, 1, 2, 3, . . . , 2045, 2046, 2047}. When it is assumed that array e(n) of the signal distortion component has only a component of (1+j) only when n is 2, e(n) becomes {0, 2+j2, 1+j, 0, . . . , 0, 0, 0}. Referring to Equation 3, in $Pe((n+N/2) \% N)$, unless n is 1 or 2, all the e(n) become zero and thus, all the Pe(n) become zero. When n is 1, $Pe((n+N/2) \% N)$ becomes $Pe((1+2048/2) \%2048)$ and $Pe((1+2048/2) \%2048)$ becomes $Pe(1025)$. When n is 1, |e(1)| is |2+j2| and thus, becomes $\sqrt{(2)^2+(2)^2}=2\sqrt{2}$. That is, |e(2)| is greater than zero.

When n is 1, a value of $e((n+N/2) \% N)$, that is, e(1025) is zero and thus, Pe(1025) has a value of e(1). Accordingly, Pe(1026) becomes 2+j2.

When n is 2, $Pe((n+N/2) \% N)$ becomes $Pe((2+2048/2) \%2048)$ and $Pe((1+2048/2) \%2048)$ becomes P(1026). When n is 2, |e(2)| is |1+j| and thus, has a value of $1\sqrt{(1)^2+(1)^2}=\sqrt{2}$. Accordingly, Pe(1026) becomes 1+j and $Pe((n+N/2) \% N)$ becomes {0, 0, 0, 0, . . . , 2+j2, 1+j, 0, 0}.

Referring to Equation 4, e(n) is {0, 0, 1+j, 0, . . . , 0, 0, 0, 0} and $Pe((n+N/2) \% N)$ is {0, 0, 0, 0, . . . , 2+j2, 1+j, 0, 0} and thus, c(n) becomes {0, 2+j2, 1+j, 0, . . . , 2+j2, 1+j, 0, 0}.

Referring to Equation 5 through Equation 7, unless n is 1 or 2, c(n) becomes zero, and only when n is 1 or 2, C(K) has a value. When computing by folding C(k), {e(1)×exp((−j2πk)/2048)+e(1025)×exp((−j2πk)/2048)×exp(−jπk)}+{e(1)×exp((−j4πk)/2048)+e(1026)×exp((−j4πk)/2048)×exp(−jπk)} is obtained. When k is an even number, exp(−jπk) becomes 1, and when k is an odd number, exp(−jπk) becomes −1.

e(1) and e(1025) are equal to 2+j2, and e(2) and e(1026) are equal to 1+j.

Accordingly, when G is 1, and when k is an odd number, C(k) becomes zero. When G is −1, and when k is an even number, C(k) becomes zero.

Referring to Equation 3, in $Pe((n+N/2) \% N)$, in a case where a signal distortion component is present at the point n, and the signal distortion component is already present at the point $(n+N/2) \% N$, C(k) may not become zero when G is 1, and when k is an odd number. Here, a value close to zero may be obtained. There occurs an effect that the signal distortion component at the point n and the signal distortion component at the point $(n+N/2) \% N$ are mutually offset, thereby decreasing EVM. Even when G is −1 and when k is an even number, C(k) may not become a zero. A value close to zero may be obtained and EVM may decrease.

The G selector 120 selects a value of G. G may have a real number value between −1 and 1.

As described above, in a case where G is 1, c(k) may become zero when k is an odd number, and may be or may be not zero depending on a value of k when k is an even number.

In a case where G is −1, c(k) may become zero when k is an even number, and may be or may be not zero depending on a value of k when k is an odd number.

That is, by selecting G as any one of −1 or 1, it is possible to adjust a signal distortion component in a subcarrier at a predetermined position that is an odd number or an even number.

When a value between −1 and 1 is selected as G, instead of −1 and 1, it is possible to adjust a signal distortion component in a subcarrier at a predetermined position base on a selected value. G may also be selected to decrease the signal distortion component based on predetermined multiples of k.

When c(n) or $Pe((n+N/2) \% N))$ is computed, the G selector 120 may have no need to select G. Therefore, G may be selected before computing $Pe((n+N/2) \% N))$. Alternatively, G may be preset in a communication system or the signal distortion component adjusting apparatus 100 according to the present invention.

Describing a wireless communication system in which a signal distortion component is adjusted by applying the signal distortion component adjusting apparatus 200 with reference to FIG. 2, the wireless communication system in which the signal distortion component is adjusted includes the OFDM modulation apparatus 210, a delay apparatus 220, a peak detection apparatus 230, the signal distortion component adjusting apparatus 100, a peak control apparatus 240, and an adder 250.

The OFDM modulation apparatus 210 transforms an input frequency domain signal X(k) to a time domain signal x(n) through inverse discrete Fourier transform (IDFT) or inverse fast Fourier transform (IFFT).

The delay apparatus 220 time shifts x(n) and transforms x(n) to a signal that is input to the delay apparatus 220 in the time domain.

The peak detection apparatus 230 computes a signal distortion component e(n) from x(n).

Specifically, the peak detection apparatus 230 receives the signal x(n) that is transformed to the time domain by the OFDM modulation apparatus 210 and thereby computes the signal distortion component e(n) using the aforementioned Equation 2.

The signal distortion component adjusting apparatus 100 adjusts a signal distortion by computing c(n) from e(n) and by making C(k) of subcarrier corresponding to either an even number or an odd number become zero.

The peak control apparatus 240 decreases a PAPR using c(n). A method of decreasing the PAPR generally decreases the PAPR by removing a peak value greater than or equal to a threshold set as the maximum allowable peak value in the system.

Specifically, the peak control apparatus 240 may decrease the PAPR using a method such as a cancellation pulse generator (CPG), peak-cancellation crest factor reduction (PC-CFR), filtering, and the like.

The adder 250 generates an output signal by adding a signal that is obtained by time delaying the input time domain signal x(n) by the delay apparatus 220 and a signal output by the peak control apparatus 240.

Compared to the method of decreasing, by the peak control apparatus 240, a PAPR using e(n), when decreasing the PAPR using c(n), a signal distortion according to a signal distortion component decreases without a signal distortion component in a subcarrier at a predetermined position. Therefore, when transferring a signal using the subcarrier at the predetermined position, it is possible to transfer a highly reliable signal.

That is, in a case where G is 1, when transmitting a signal through an odd subcarrier, signal distortion decreases and thus, it is possible to transmit a highly reliable signal. In a case where G is −1, when transmitting a signal through an even subcarrier, signal distortion decreases and thus, it is possible to transmit a highly reliable signal.

Decrease of a signal distortion component in a subcarrier at a predetermined position may decrease EVM in the subcarrier at the predetermined position. It is because EVM indicates residual noise and distortion remaining after removing an idealistic signal version.

Figure 3:
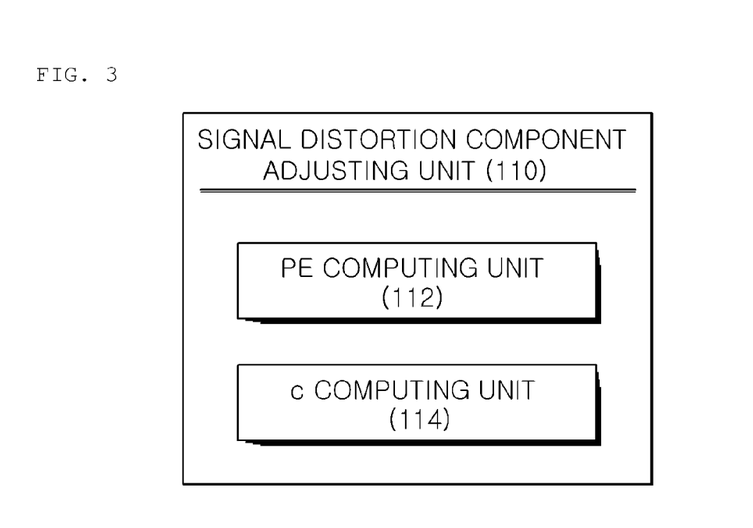
FIG. 3 is a block diagram illustrating a signal distortion component adjusting unit of a signal distortion component adjusting apparatus according to an exemplary embodiment of the present invention.

FIG. 3 is a block diagram illustrating the signal distortion component adjusting unit 110 of a signal distortion component adjusting apparatus 100 according to an exemplary embodiment of the present invention.

Describing the signal distortion component adjusting unit 110 with reference to FIG. 3, the signal distortion component adjusting unit 110 includes a Pe computing unit 112 and a c computing unit 114.

The Pe computing unit 112 performs an operation for adding a signal distortion component so that a signal distortion component value at a point n may become equal to a signal distortion component value at a point (n+N/2) % N.

Specifically, the Pe computing unit 112 may compute Pe((n+N/2) % N)) that is a signal distortion component to be added according to the aforementioned Equation 3.

The c computing unit 114 computes a new signal distortion component c(n) by adding e(n) and Pe((n+N/2) % N)) computed by the Pe computing unit 112. c(n) may be computed by multiplying Pe((n+N/2) % N)) by G that is a predetermined real number between −1 and 1, and by adding the multiplication result and e(n).

Specifically, the c computing unit 114 may compute c(n) according to the aforementioned Equation 4.

The signal distortion component adjusting apparatus 100 according to the present invention may make the signal distortion component C(k) of a frequency domain become zero when a subcarrier order k of the frequency domain is an odd number or an even number based on G. Accordingly, when transmitting a data signal having a high importance using the present invention, it is possible to increase the reliability by transmitting the signal using a predetermined subcarrier in which C(k) becomes zero.

Even when retransmitting a signal using the present invention, it is possible to increase the retransmission reliability by selecting a subcarrier having low EVM.

The signal distortion component adjusting apparatus 100 according to the present invention may be applied to a base station. For example, when two base stations transmit the same data, one base station may transmit a signal using an even subcarrier by selecting G as −1, and another base station may transmit a signal using an odd subcarrier by selecting G as 1. The above transmission may decrease interference between signals that are transmitted between base stations, and may increase an SNR and the like.

Figure 4:
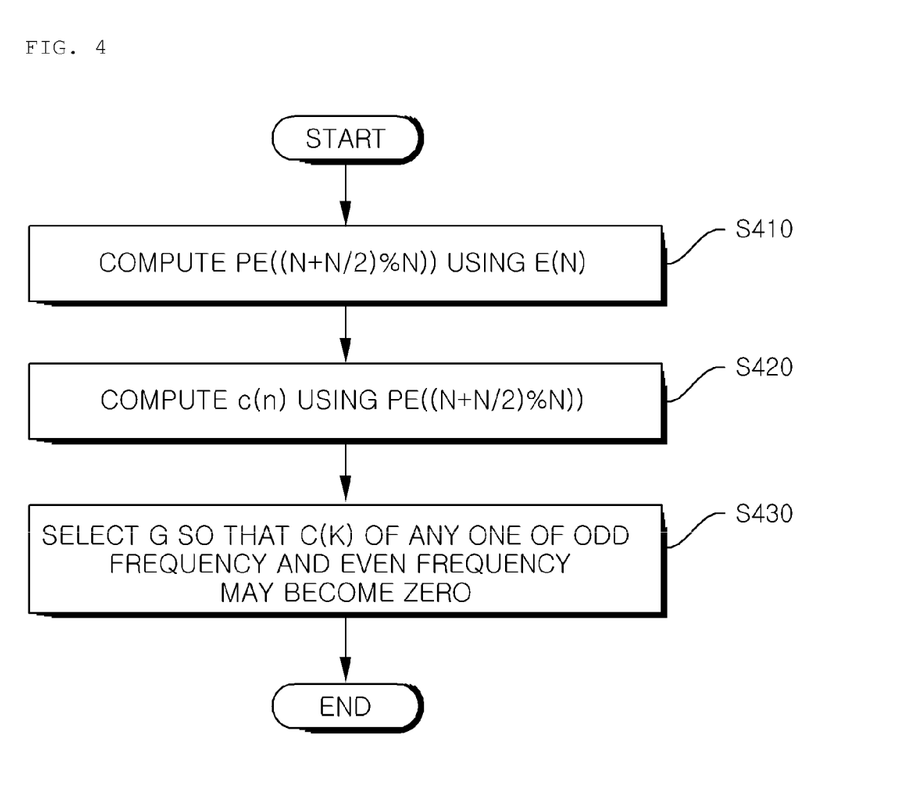
FIG. 4 is a flowchart illustrating a method of adjusting a signal distortion component according to an embodiment of the present invention.

FIG. 4 is a flowchart illustrating a method of adjusting a signal distortion component according to an embodiment of the present invention.

Describing a signal distortion component adjusting method with reference to FIG. 4, the signal distortion component adjusting method is a method of adjusting EVM of subcarriers of a predetermined position using c(n) in which Pe((n+N/2) % N)) is added to e(n), in a method of adjusting a signal distortion component occurring when decreasing a PAPR in a communication system of an OFDM technology or an OFDMA scheme.

Specifically, the Pe computing unit 112 computes Pe((n+N/2) % N)) (step S410). Equation 3 may be used to compute Pe((n+N/2) % N)).

The c computing unit 114 computes c(n) using the computed Pe((n+N/2) % N)) (step S420). Equation 4 may be used to compute c(n).

The G selector 120 selects G (step S430). When the G selector 120 selects G as −1, EVM of even subcarrier decreases. When G is −1, EVM of odd subcarrier may increase. When the G selector 120 selects G as 1, EVM of odd subcarrier decreases. When the G selector 120 selects G as 1, EVM of even subcarrier may increase.

When using a subcarrier having low EVM, it is possible to transmit a highly reliable signal. It is also possible to decrease EVM of subcarrier at a predetermined position by determining G as a value between −1 and 1.

The signal distortion component adjusting method according to the present invention may make the adjusted signal distortion component C(k) of a frequency domain become zero when a subcarrier order k of the frequency domain is an odd number or an even number based on G. That is, it is possible to adjust EVM in the subcarrier at the predetermined position. Accordingly, when transmitting a data signal having a high importance using the present invention, it is possible to increase the reliability by transmitting the signal using a predetermined subcarrier in which C(k) becomes zero.

Even when retransmitting a signal using the present invention, it is possible to increase the retransmission reliability by selecting a subcarrier having low EVM.

The signal distortion component adjusting method according to the present invention may be applied to a base station. For example, when two base stations transmit the same data, one base station may transmit a signal using an even subcarrier by selecting G as −1, and another base station may transmit a signal using an odd subcarrier by selecting G as 1. The above transmission may decrease interference between signals that are transmitted between base stations, and may increase an SNR and the like.

A block diagram of the signal distortion component adjusting apparatus 100 according to an exemplary embodiment of the present invention needs to be understood to indicate an exemplary conceptual perspective of embodying the principle of the present invention. Similarly, all of the flowcharts, state conversion diagrams, pseudo codes, and the like may be substantially indicated in computer-readable recording media, and need to be understood to indicate various processes that are performed by a computer or a processor regardless of whether the computer or the processor is clearly illustrated.

Functions of various devices that are illustrated in drawings including the processor or a functional block indicated as a concept similar thereto may be provided as use of hardware having capability of executing software in association with appropriate software as well as exclusive hardware. When the functions are provided by the processor, the functions may be provided by a single exclusive processor, a single shared processor, or a plurality of individual processors, and a portion thereof may be shared.

Clear use of the processor, control, or a term provided as a concept similar thereto should not be interpreted by exclusively citing hardware having the capability of executing software and should be understood to suggestively include ROM, RAM, and nonvolatile memory, for storing a digital signal processor (DSP), hardware, and software without any limitation. Widely known other hardware may also be included.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for adjusting a signal distortion component occurring when a peak to average power ratio (PAPR) decreases in a communication system of an orthogonal frequency division multiplexing (OFDM) technology or an orthogonal frequency division multiple access (OFDMA) scheme, the apparatus comprising:
   a signal distortion component adjusting unit to add an additional signal distortion component Pe((n+N/2) % N) to a signal distortion component e(n) that is obtained by subtracting a threshold Th value, set to decrease peak power, from an absolute value of a time domain signal x(n) of an input signal, and to thereby adjust the signal distortion component,
   wherein n denotes an integer from zero to a number that is obtained by subtracting '1' from N that is the number of signals processed based on a symbol unit, and % denotes a modular operation.

2. The apparatus of claim 1, wherein when an absolute value of the e(n) is not zero and when an absolute value of e((n+N/2) % N) is zero in the n, the Pe((n+N/2) % N) has the same value as the e(n), and in other cases, is zero.

3. The apparatus of claim 1, wherein the signal distortion component is adjusted by adding, to the e(n), G×Pe((n+N/2) % N) that is obtained by multiplying the Pe((n+N/2) % N) by G that is any one real number among real numbers from −1 to 1.

4. The apparatus of claim 3, further comprising: a G selector to select the G to adjust error vector magnitude of subcarrier in a predetermined position.

5. The apparatus of claim 4, wherein the G selector selects G as 1 to decrease the error vector magnitude of the subcarrier when the subcarrier is an odd subcarrier, or selects G as −1 to decrease the error vector magnitude of the subcarrier when the subcarrier is an even subcarrier.

6. The apparatus of claim 1, wherein the adjusted signal distortion component in which the additional signal distortion component is added to the signal distortion component is a component in which a value in n is equal to a value in (n+N/2) % N.

7. The apparatus of claim 1, wherein the e(n) is obtained by multiplying a phase component e(n) of the x(n) by an imaginary number unit, by generating, as an exponential function, the e(n) multiplied by the imaginary number unit, and by multiplying, by the exponential function, a value that is obtained by subtracting the Th value from the absolute value of the x(n).

8. A method of adjusting a signal distortion component occurring when a PAPR decreases in a communication system of an OFDM technology or an OFDMA scheme, wherein the method is performed by one or more processors, the method comprising:
   adding an additional signal distortion component Pe((n+N/2) % N) to a signal distortion component e(n) that is obtained by subtracting a threshold Th value, set to decrease peak power, from an absolute value of a time domain signal x(n) of an input signal, to thereby adjust the signal distortion component,
   wherein n denotes an integer from zero to a number that is obtained by subtracting '1' from N that is the number of signals processed based on a symbol unit, and % denotes a modular operation.

9. The method of claim 8, wherein when an absolute value of the e(n) is not zero and when an absolute value of e((n+N/2) % N) is zero in the n, the Pe((n+N/2) % N) has the same value as the e(n), and in other cases, is zero.

10. The method of claim 8, wherein the c(n) is obtained by adding the e(n) to G×Pe((n+N/2) % N) that is obtained by multiplying the Pe((n+N/2) % N) by G that is any one real number among real numbers from −1 to 1.

11. The method of claim 10, further comprising:
   selecting the G to adjust error vector magnitude of subcarrier in a predetermined position.

12. The method of claim 10, wherein the selecting of the G selects G as 1 to decrease the error vector magnitude of the subcarrier when the subcarrier is an odd subcarrier, or selects G as −1 to decrease the error vector magnitude of the subcarrier when the subcarrier is an even subcarrier.

13. The method of claim 8, wherein the e(n) is obtained by multiplying a phase component e(n) of the x(n) by an imaginary number unit, by generating, as an exponential function, the e(n) multiplied by the imaginary number unit, and by multiplying, by the exponential function, a value that is obtained by subtracting the Th value from the absolute value of the x(n).

14. A wireless communication system in which a signal distortion component is adjusted and comprising an apparatus of adjusting a signal distortion component occurring when a PAPR decreases in a communication system of an OFDM technology or an OFDMA scheme, wherein the signal distortion component adjusting apparatus comprises a signal distortion component adjusting unit to add an additional signal distortion component Pe((n+N/2) % N) to a signal distortion component e(n) that is obtained by subtracting a threshold Th value, set to decrease peak power, from an absolute value of a time domain signal x(n) of an input signal, and to thereby adjust the signal distortion component, and n denotes an integer from zero to a number that is obtained by subtracting '1' from N that is the number of signals processed based on a symbol unit, and % denotes a modular operation.

15. The system of claim 14, wherein the Pe((n+N/2) % N) satisfies the following Equation 9.

$$Pe((n+N/2)\%N) = \begin{cases} e(n) & \text{if } (|e(n)| > 0) \text{ and } (|e((n+N/2)\%N)| = 0) \\ 0 & \text{else} \end{cases} \quad \text{[Equation 9]}$$

16. The system of claim 14, further comprising:

an OFDM modulation apparatus to receive a frequency domain signal, and to transform the frequency domain signal to the time domain signal x(n).

17. The system of claim 14, further comprising:

a peak detection apparatus to receive the x(n), and to compute the e(n) using the following Equation 10.

$$e(n) = \begin{cases} (|x(n)| - Th)\exp(j\theta(n)) & \text{if } |x(n)| > Th \\ 0 & \text{else} \end{cases} \quad \text{[Equation 10]}$$

* * * * *